W. ROBERTS.
MANURE LOADER.
APPLICATION FILED MAR. 29, 1909.

948,552.

Patented Feb. 8, 1910.

3 SHEETS—SHEET 3.

Inventor
WILLIAM ROBERTS

Witnesses

UNITED STATES PATENT OFFICE.

WILLIAM ROBERTS, OF ANITA, IOWA.

MANURE-LOADER.

948,552.  Specification of Letters Patent.  Patented Feb. 8, 1910.

Application filed March 29, 1909. Serial No. 486,404.

*To all whom it may concern:*

Be it known that I, WILLIAM ROBERTS, a citizen of the United States, residing at Anita, in the county of Cass and State of Iowa, have invented certain new and useful Improvements in Manure-Loaders, of which the following is a specification.

This invention relates to hoisting and dumping devices and more particularly to a device of this class which is especially designed for loading manure upon a suitable transporting vehicle.

The primary object of my invention is to provide a manure loader whereby the manure may be very quickly hoisted and automatically dumped.

Another object is to provide improved means for regulating the degree of inclination of the tilting platform to evenly distribute the load in the vehicle.

A further object is to provide new and novel means for retaining the scoop upon the tilting platform when the same is being dumped.

A still further object is to provide a very simple and inexpensive construction which will greatly lessen the labor of loading vehicles and which will efficiently perform the function for which it is designed.

With these and other objects in view the present invention consists in the combination and arrangement of parts as will be hereinafter more fully described and particularly pointed out in the appended claims it being understood that changes in the specific structure shown and described may be made within the scope of the claims without departing from the spirit of the invention.

Figure 1:
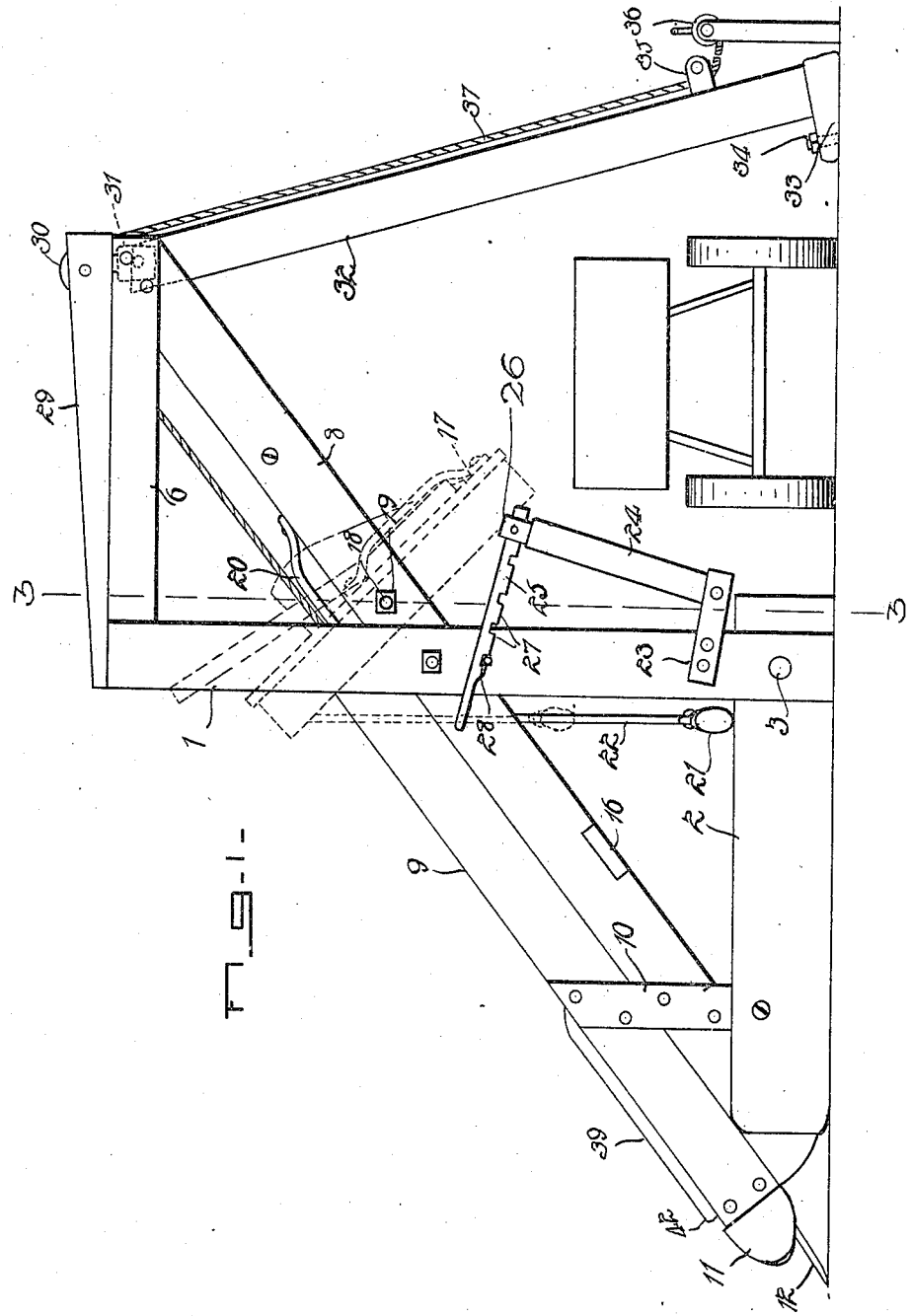
Figure 2:
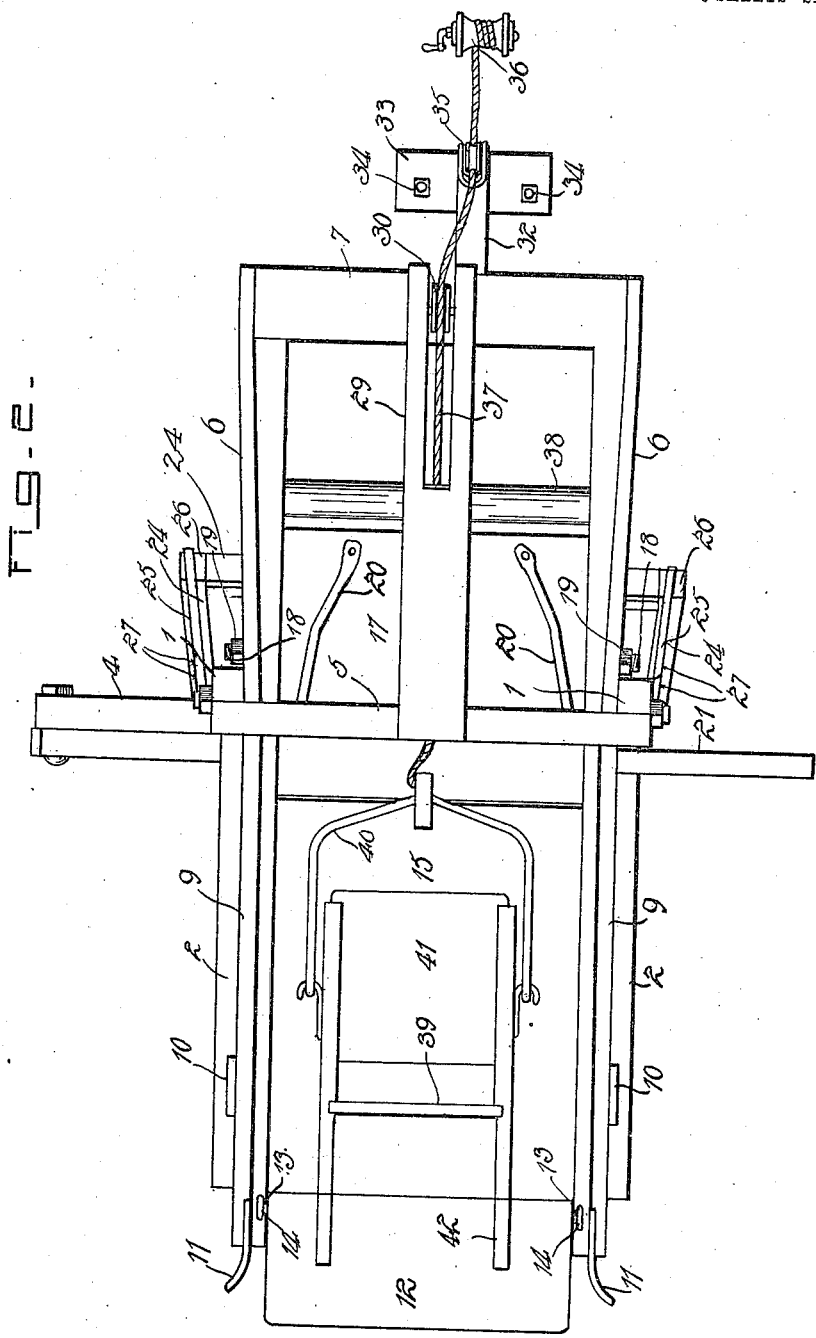
Figure 3:
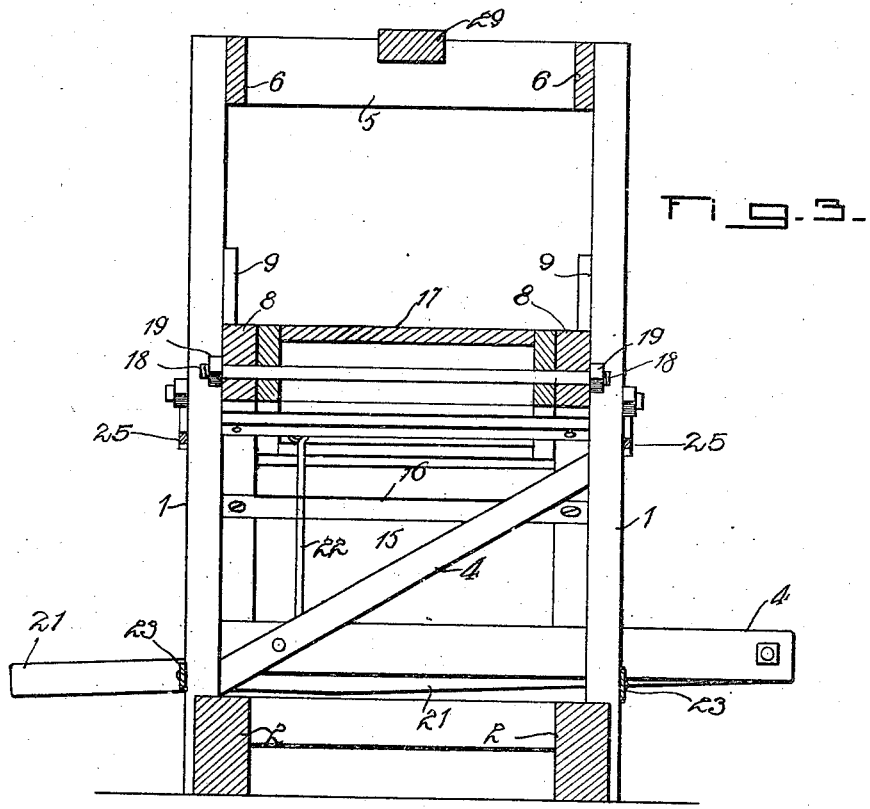
Figure 4:
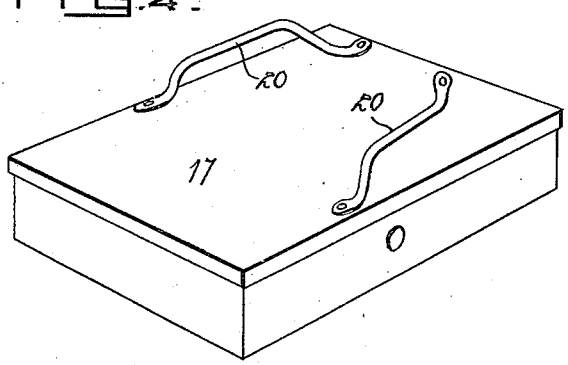

In the drawings forming a part of this specification, and in which like numerals of reference indicate similar parts in the several views, Figure 1 is a side elevation of my improved manure loader showing a vehicle in position to be loaded. Fig. 2 is a top plan view thereof. Fig. 3 is a transverse section on the line 3—3 of Fig. 1, looking toward the front of the loader. Fig. 4 is a detail perspective view of the tilting platform.

Referring to the drawings 1 indicates the vertically disposed, parallel uprights, and 2 the sills or base beams, to the rear ends of which the uprights are secured by means of the bolts 3. The uprights are suitably braced by the cross bars 4, and are connected at their upper ends by the transverse bar 5. Horizontally extending from the uprights 1 and to the rear thereof, are the parallel bars 6, the outer ends of which are connected by the transverse bar 7.

The above described elements form what is substantially a Z-shaped frame. It is obvious that various minor changes may be made in the shape, size and details of construction of said frame without materially altering the purposes thereof.

Secured to the extremities of the bars 6 and extending downwardly therefrom at an angle of approximately 45 degrees are the members 8, the forward ends of which are secured to the front ends of the sills 2 by screws or other analogous devices. Upon the upper edge of the members 8 are the guide bars 9 which are secured to standards 10 rising from the sills, and to the uprights 1. To the lower front ends of the bars 9 are attached the outwardly curved metal plates 11. A plate 12 is provided with trunnions 13 near the rear edge thereof, which are pivoted in eyes 14 in the upper edge of the members 8. A platform 15 is secured between the opposed faces of the members 8 to cleats 16 and terminates in advance of the uprights 1.

A tilting platform 17 is pivotally mounted upon the bolt 18 between the inclined members 8. This bolt is held against rotative movement by means of the clamping nuts 19 which are threaded upon the ends thereof. When in its normal position the platform 17 together with the platform 15, form what is practically one continuous platform. Near either side of the platform 17 are the converging rods 20 the purpose of which will be later described.

One of the bars 4 is extended beyond the side of the frame and has pivoted thereto one end of a lever 21. Secured in an eye upon said lever is one end of a rod 22 the other end of which is secured to the underside of the platform 17 at the front end thereof. The lever is provided with an operating handle, and it will be seen, that when the platform is tilted the lever 21 will be raised. The operator may readily return the platform to its normal position by simply depressing the lever. In order to regulate the angle at which the platform 17 is tilted, to distribute the manure or other material evenly within the receiving vehicle, I have accomplished this result in the following manner. Near the lower end of the uprights 1 are secured the bracket plates 23, to the outer ends of which is pivoted the substantially U-shaped supporting frame 24. A bar 25 is pivoted between the ears 26 upon the upper transverse member of said frame. The lower edge of the bars 25 is provided with a plurality of notches 27, any one of which is adapted to engage over a pin 28, secured in the upright 1. It will thus be seen that the frame 24 may be adjusted and the downward movement of the forward end of the platform 17 limited by the horizontal portion 24' thereof, so that the inclination of the platform will be such that too much material will not be deposited in one part of the vehicle.

Secured to the front and rear transverse bars 5 and 7 is the bar 29, centrally disposed between the bars 6 and in parallel relation therewith. The outer end of the bar 29 is bifurcated to receive the sheave or pulley 30. Pivoted to the underside of the bar 7, beneath the pulley 30, is the U-shaped bracket 31 in which is pivoted the upper end of a post 32. To the lower end of this post is secured the foot piece 33, which is adapted to be held in position upon a base block by the bolts 34 which extend upwardly therethrough and are provided with suitable securing nuts. Upon the outer edge of the post 32 and slightly above the lower end thereof is a second pulley 35. A drum 36 is arranged in the rear of the post, and has secured thereto one end of a cable 37, the other end of which passes around the pulley 35 and over the pulley 30, and has frictional engagement with a roller 38, supported between the inclined members 8. A scoop 39 is provided as the conveying member, and has the ends of a bail 40 pivoted to the sides thereof. The end of the cable is attached to the center of this bail, and when the drum is operated will draw the scoop up the inclined platform as will be readily seen. The scoop is further provided with a metallic bottom 41 and has the usual operating handles 42.

The operation of my improved loader is very simple and will be readily understood from the above description. A suitable conveyance is first positioned between the rear of the inclined platform and the post 32. The scoop 39 is now filled with manure and the drum 36 operated. As the cable is wound upon the drum the scoop will be drawn up the inclined platform 15 and on to the pivoted platform 17, the front edge of the metal bottom of the scoop being disposed beneath the converging rods 20. Owing to the weight of the scoop and the material contained therein, the platform 15 will be tilted backward and downward until the bottom thereof rests upon the frame 24, when the contents of the scoop will be discharged into the vehicle stationed below. It will be seen that as the scoop is securely held between the rods 20, that there is no danger of the same sliding from the platform. The bail 41, will of course be folded over and rest upon the handles of the scoop, while the lever 21 will be in a raised position. The lever is now pulled down, when the platform and scoop will assume their former positions. Upon reversing the rotation of the drum the scoop will descend to be again filled and the operation repeated. The curved metal plates 11 and the pivoted plate 12 avoid the liability of too much material being hoisted, which would fall off and seriously interfere with the operation of the several parts. The front edge of the plate 12 is rounded to prevent the front edge of the scoop from catching under the same. When it is desired to move the loader the pivoted plate 12 may be folded up out of the way.

From the foregoing it will be seen that I have provided a manure loader which is extremely simple and inexpensive in construction and which may be very quickly operated.

It will be understood that the drum may be either manually operated or connected to an electric motor. I do not wish to limit myself in this respect as there are numerous ways in which the scoop may be hoisted in position to be dumped.

Having thus described my said invention, what I claim as new and desire to secure by United States Letters Patent is:

1. A device of the character described, comprising a frame, inclined parallel bars secured to the upper and lower extremities of said frame, an inclined platform secured between said bars, a pivoted platform mounted between said bars and normally disposed in alinement with said stationary platform, a stop member transversely disposed below said pivoted platform, said member being pivoted on said frame, means for adjusting the inclination of said stop member, said member being adapted to limit the downward movement of said platform, and a scoop adapted to be drawn up said stationary platform onto said pivoted platform to operate the same.

2. A device of the character described comprising a substantially Z-shaped frame, inclined parallel bars connected to the ends of the horizontal members of said frame, an inclined platform secured between said bars, a pivoted platform mounted between said bars and normally disposed in alinement with said stationary platform, a U-shaped frame pivoted in brackets secured to the upright members of said first mentioned frame, means for adjusting the inclination of said frame, said frame being adapted to limit the downward movement of said pivoted platform, and a scoop adapted to be drawn up said stationary platform onto said pivoted platform to operate the same.

3. A device of the character described comprising a frame, guide bars secured upon said frame, an inclined stationary platform secured between the sides of said frame, a pivoted platform secured in said frame above said stationary platform and normally disposed in alinement therewith, converging bars secured upon said pivoted platform, a substantially U-shaped supporting frame pivoted upon said first mentioned frame, a notched bar pivoted between ears upon the upper horizontal portion of said last mentioned frame, a pin secured in one of the vertical members of said first mentioned frame adapted to engage with the notches of said bar to limit the outward movement of said supporting frame, said supporting frame being adapted to engage with the under side of the tilting platform, means for returning said pivoted platform to its normal position, and a scoop adapted to be drawn up said stationary platform onto said pivoted platform to operate the same.

4. A device of the character described comprising a frame, a post pivoted in a bracket secured to said frame, guide bars secured upon said frame, outwardly bent metal plates secured to the lower ends of said guide bars, parallel inclined bars secured to said frame, a stationary platform secured between said bars, a metal plate pivotally mounted in the lower end of said bars, a pivoted platform secured in said frame above said stationary platform and normally disposed in alinement therewith, means adjustable upon said frame for limiting the downward movement of said platform, means for returning said platform to its normal position, a bar secured to said frame having one of its ends bifurcated to receive a pulley, a pulley mounted upon the outer edge of said post adjacent to the lower end thereof, a cable adapted to be passed over said pulleys, and a guide rod supported in said frame, one end of said cable being attached to the scoop adapted to be drawn upon said pivoted platform, inclined rods secured upon said platform and adapted to retain said scoop in position, and a lever pivoted upon said frame and adapted to return said pivoted platform to its normal position.

5. A device of the character described comprising a substantially Z-shaped frame, a post pivotally secured to the end of one of the horizontal portions of said frame, means for securing said post in position, inclined parallel bars secured to the ends of the horizontal portions of said frame, guide members mounted upon said bars, a stationary platform secured between said bars, a pivoted platform mounted above said stationary platform and normally disposed in alinement therewith, means adjustable upon said frame for limiting the downward movement of said pivoted platform, a lever pivoted to said frame, a rod secured to said lever and to the under side of the forward end of said pivoted platform, a scoop provided with a metallic bottom, means for hoisting said scoop upon said pivoted platform, and means secured upon said platform for retaining said scoop thereon when the same is tilted.

In testimony whereof I affix my signature, in presence of two witnesses.

WILLIAM ROBERTS.

Witnesses:
 Ed M. Blakesley,
 B. D. Forshay.